United States Patent
Wei et al.

(10) Patent No.: US 10,821,547 B2
(45) Date of Patent: Nov. 3, 2020

(54) AUTOMATIC STEP STEEL PLATE CUTTING AND WELDING DEVICE, AND METHOD THEREOF

(71) Applicant: KUN SHAN THETA MICRO CO., LTD, Jiangsu (CN)

(72) Inventors: Zhiling Wei, Jiangsu (CN); Jun Ning, Jiangsu (CN); Zhaowen Yang, Jiangsu (CN); Wuhuai Wang, Jiangsu (CN); Haijun Xue, Jiangsu (CN)

(73) Assignee: KUN SHAN THETA MICRO CO., LTD., Jiangsu (CN)

( * ) Notice: Subject to any disclaimer, the term of this patent is extended or adjusted under 35 U.S.C. 154(b) by 0 days.

(21) Appl. No.: 16/067,114

(22) PCT Filed: Jul. 26, 2017

(86) PCT No.: PCT/CN2017/094419
§ 371 (c)(1),
(2) Date: Jun. 28, 2018

(87) PCT Pub. No.: WO2018/133358
PCT Pub. Date: Jul. 26, 2018

(65) Prior Publication Data
US 2019/0358742 A1 Nov. 28, 2019

(30) Foreign Application Priority Data

Jan. 23, 2017 (CN) .......................... 2017 1 00506322
Jan. 23, 2017 (CN) .......................... 2017 1 00509744

(51) Int. Cl.
*B23K 26/08* (2014.01)
*B23K 26/38* (2014.01)
(Continued)

(52) U.S. Cl.
CPC ............ *B23K 26/08* (2013.01); *B23K 26/046* (2013.01); *B23K 26/24* (2013.01); *B23K 26/38* (2013.01)

(58) Field of Classification Search
CPC .... B23K 26/08; B23K 26/0884; B23K 26/38; B23K 26/24; B23K 26/0646; B23K 37/047; B23K 37/0461; B23K 37/0408
See application file for complete search history.

(56) References Cited

U.S. PATENT DOCUMENTS

| | | | |
|---|---|---|---|
| 6,127,648 A | 10/2000 | Scott | |
| 2012/0055975 A1* | 3/2012 | Wei ...................... | B23K 1/0016 228/6.1 |
| 2017/0182603 A1* | 6/2017 | Alber ..................... | B23K 26/02 |

FOREIGN PATENT DOCUMENTS

| CN | 101633079 A | 1/2010 |
|---|---|---|
| CN | 202506978 U | 10/2012 |

(Continued)

*Primary Examiner* — Geoffrey S Evans
(74) *Attorney, Agent, or Firm* — Global IP Services; Tianhua Gu

(57) ABSTRACT

A fully-automatic cutting and welding apparatus for stepped steel plate, comprising a multi-function motion module (1), an automatic feed library turntable (2), a product flip platform (3), a steel plate bearing module (4), a pedestal (5), and a base (6). The multi-function motion module (1) is capable of performing motion in a Y-axis direction on the pedestal (5); the pedestal (5) is fixed on a surface edge of the base (6); the automatic feed library turntable (2) is fixed at one end of the base (6); the product flip platform (3) is disposed between the automatic feed library turntable (2) and the steel plate bearing module (4), and the steel plate bearing module (4) is fixed at the other end of the base (6) for bearing and fixing a steel plate, and is used as a welding platform for the final steel plate step part.

18 Claims, 9 Drawing Sheets

(51) Int. Cl.
 *B23K 26/046* (2014.01)
 *B23K 26/24* (2014.01)

(56) References Cited

FOREIGN PATENT DOCUMENTS

| | | | |
|---|---|---|---|
| CN | 104096976 A | 10/2014 |
| CN | 105382424 A | 3/2016 |
| CN | 106735881 A | 5/2017 |
| CN | 106735882 A | 5/2017 |

* cited by examiner

AUTOMATIC STEP STEEL PLATE CUTTING AND WELDING DEVICE, AND METHOD THEREOF

CROSS REFERENCE TO RELATED PATENT APPLICATION

The present application is the US national stage of PCT/CN2017/094419 filed on Jul. 26, 2017, which claims the priorities of CN2017100506322 filed on Jan. 23, 2017 and CN2017100509744 filed on Jan. 23, 2017, which applications are incorporated herein by reference.

BACKGROUND OF THE PRESENT INVENTION

Field of Invention

The present invention belongs to the SMT field, and specifically, relates to a fully-automatic cutting and welding integrated apparatus and method for stepped steel plate.

Description of Related Arts

In the SMT industry, electronic components with different specifications need different solder paste amounts when being welded onto a circuit board. When electronic components with different specifications appear on the same surface of the circuit board, to accurately control the solder paste amounts to obtain good welding quality, solder pastes with different thicknesses need to be printed on the same surface of the circuit board. Therefore, a so-called locally thickening and locally thinning stepped special template, such as an SMT steel plate (100) with a pattern opening (101) shown in FIG. 1, appears accordingly. A local area of the steel plate (100) needs to be thickened or thinned according to requirements of printing of the solder paste amounts, that is, a stepped steel plate having a thickening area (102) and a thinning area (103) is formed.

In the prior art, a step area on the SMT steel plate is manufactured by using an etching or electroforming process. However, because the etching or electroforming process causes great pollution to an environment due to itself, it is quite a headache to manufacturers. The environment pollution problem greatly increases costs of manufacturing of steel plates. In addition, a complex process of the etching or electroforming process also makes a whole production time relatively long, reduces production efficiency, and cannot satisfy demands for production and requirements on environmental protection to the maximum degree.

SUMMARY OF THE PRESENT INVENTION

In view of the above, the present invention provides a fully-automatic cutting and welding apparatus and method for stepped steel plate. A stepped steel plate is manufactured in a laser cutting and welding manner, to resolve an environment pollution problem from a source, and a manufacturing process of laser-cutting and welding the steel plate is much simpler than an etching and electroforming process, thereby greatly saving a production time. In addition, a device in this application differs from a conventional steel plate cutting or welding machine. The conventional cutting or welding machine can complete only one operation, while cutting and welding functions are integrated in the fully-automatic cutting and welding apparatus for stepped steel plate of this application, and a whole process of manufacturing a steel plate step part is a fully-automatic operation, thereby greatly improving production efficiency while saving manpower.

The present invention provides a fully-automatic cutting and welding apparatus for stepped steel plate, and specific technical solutions thereof are as follows:

A fully-automatic cutting and welding apparatus for stepped steel plate comprises a multi-function motion module, an automatic feed library turntable, a product flip platform, a steel plate supporting module, a pedestal, and a base, where the multi-function motion module is capable of implementing cutting and welding of a stepped steel plate and is movably disposed on the pedestal; the pedestal is fixed on a surface edge of the base; the automatic feed library turntable is configured to bear a soldering lug for manufacturing a steel plate step part and is fixed at one end of the base; the product flip platform is disposed between the automatic feed library turntable and the steel plate supporting module, and functions as a transit platform, and is configured to buffer a soldering lug already cut on the automatic feed library turntable; and the steel plate supporting module is fixed at the other end of the base for supporting and fixing a steel plate, and is used as a welding platform for the final steel plate step part.

Further, the multi-function motion module comprises a beam and an X-axis moving plate; an X-axis motor and a sliding rail are fixed on the beam; the motor provides power to motion of the X-axis moving plate; the X-axis moving plate is movably disposed on the beam by using the sliding rail and is capable of performing motion in an X-axis direction on the sliding rail; and the X-axis moving plate is provided with a Z-axis motor, a Z-axis sliding block, and a Z-axis moving plate, the Z-axis moving plate is movably disposed on the X-axis moving plate by using the Z-axis sliding block, and the Z-axis motor is capable of implementing motion of the Z-axis moving plate in a vertical direction; a positioning camera, a focusing lens cutting and welding apparatus, a height determining sensor, and a double-head suction cup are configured in parallel on the Z-axis moving plate, and the positioning camera is capable of implementing alignment of the steel plate and the soldering lug; the focusing lens cutting and welding apparatus is used for cutting and soldering the steel plate and the soldering lug; the height determining sensor is configured to control distances from the positioning camera, the focusing lens cutting and welding apparatus, and the double-head suction cup to surfaces of a steel sheet and the soldering lug; and the double-head suction cup is fixed on both sides of the Z-axis moving plate and is configured to suck and grab the soldering lug.

Further, the automatic feed library turntable comprises a fixing plate and a soldering lug storage mechanism, and the fixing plate is configured to support and fix the soldering lug storage mechanism; the soldering lug storage mechanism comprises a soldering lug pedestal, a soldering lug platform, a motor, a speed reducer, and a motor base, the soldering lug pedestal has a regular cubic structure, the soldering lug platform is fixed on a side surface of the soldering lug pedestal, the motor and the speed reducer cooperate to control rotation of the soldering lug pedestal, and the motor base functions as a joint between the fixing plate and the soldering lug storage mechanism.

Further, the soldering lug platform comprises an air cylinder, an adsorption table, a platform substrate, a spacer block, a sliding module, and a soldering lug tensioning frame assembly; the soldering lug platform is fixed on the soldering lug pedestal by using the platform substrate; the air cylinder is directly fixed at a central position on one side of the platform substrate; the sliding module is located on a left side and a right side of the air cylinder and is fixed on the platform substrate; the spacer block is fixed on the other side of the platform substrate; the soldering lug tensioning frame assembly is configured to clamp and tighten the soldering lug for manufacturing a steel plate step part and comprises a tensioning frame pressure plate and a tensioning frame fixed side; the tensioning frame pressure plate is movably disposed above the tensioning frame fixed side and helps the soldering lug be put in and taken out; two said soldering lug tensioning frame assemblies are provided on the soldering lug platform; one said soldering lug tensioning frame assembly is disposed above the air cylinder and the sliding module by using the tensioning frame fixed side, and the soldering lug tensioning frame assembly is capable of sliding on the sliding module under driving of the air cylinder; and the other soldering lug tensioning frame assembly is fixed on the spacer block by using the tensioning frame fixed side; the adsorption table is fixed to a middle part of the platform substrate, and the adsorption table is provided with a plurality of adsorption holes, capable of smoothly adsorbing the soldering lug on the adsorption table.

Further, the product flip platform comprises a fixing mechanism, a flip mechanism, and a camera module, and the fixing mechanism supports and fixes the flip mechanism; the fixing mechanism comprises a side plate, a reinforcing rib, and a fixed bottom plate, the side plate is fixed on two sides of the fixed bottom plate, and the reinforcing rib is fixed between two said side plates; the flip mechanism comprises a flip adsorption table, a fixed adsorption table, and a drive head, and the drive head penetrates through a middle part above the side plate by using a central shaft; one end of the flip adsorption table is fixed on the central shaft located between the two side plates, so that the flip adsorption table is capable of flipping 180° under driving of the drive head; one reinforcing rib is disposed below the other end of the flip adsorption table; the fixed adsorption table is fixed above the two reinforcing ribs and is located on the other side of the central shaft; when flipping 180°, the flip adsorption table is located right above the fixed adsorption table; and the flip adsorption table and the fixed adsorption table are both provided with a plurality of adsorption holes; and the camera module is fixed to an outer side of the side plate, and when the soldering lug on the fixed adsorption table is transferred to the template supporting module, the camera module scans and positions the soldering lug.

Further, the steel plate supporting module comprises a guide rail plate workpiece table, a steel plate adsorption module, and a steel plate tensioning mechanism; the guide rail plate workpiece table comprises a supporting frame and an operation window, and the steel plate tensioning mechanism is movably fixed in the operation window of the guide rail plate workpiece table; and the steel plate adsorption module is disposed below the operation window of the guide rail plate workpiece table and is fixed on the base.

Further, the supporting frame comprises supporting legs, workpiece sliding rails, a supporting block, and a brake; a number of the supporting leg (414) is four, the four supporting legs that are distributed in a rectangle and are directly fixed on the base; a number of the workpiece sliding rail (416) is two, the two workpiece sliding rails that are separately fixed on two of the supporting legs and are distributed side to side; the supporting block is provided with a groove matching with the workpiece sliding rail and is movably disposed at four endpoints of the workpiece sliding rail; and the brake and the supporting block are connected together and both disposed on the workpiece sliding rail; and the operation window is a rectangular window formed by a workpiece frame and the workpiece sliding rail, the workpiece frame is fixed on the supporting block and is capable of moving on the workpiece sliding rail along with the supporting block; a plurality of top blocks are arranged above the workpiece frame; a plurality of top block air cylinders are arranged below the workpiece frame; one top block air cylinder adapts to one of the top blocks, and the top block air cylinder is capable of driving the top block to perform lifting movement on the workpiece frame, and a slider strip parallel to the top block is further disposed above the workpiece frame.

Further, the steel plate adsorption module comprises a steel plate adsorption table and a transmission mechanism, the steel plate adsorption table comprises an adsorption base plate, an adsorption supporting table, and an adsorption bottom plate, the adsorption base plate is provided with a plurality of adsorption holes, configured to adsorb the steel plate so that the steel plate becomes smooth; the adsorption base plate is fixed on the adsorption supporting table; and the adsorption supporting table is fixed on the adsorption bottom plate; and the transmission mechanism comprises a transmission guide rail and a transmission sliding block, the transmission sliding block matches with the transmission guide rail, and the transmission guide rail is fixed on the base; the adsorption bottom plate is fixed to the transmission sliding block and is capable of moving on the transmission guide rail along with the transmission sliding block; a transmission manner of the transmission mechanism is belt transmission; the transmission mechanism further comprises a transmission motor and a synchronous belt matching with the motor, and one side of the synchronous belt is fixed to the adsorption bottom plate by using a synchronous belt pressure plate.

Further, the steel plate tensioning mechanism comprises a tensioning frame and a clamping sliding side; the tensioning frame is a rectangular frame; two endpoints of the clamping sliding side are movably disposed on two frames of the tensioning frame; a pressing block is fixed on the tensioning frame; the pressing block is provided with a screw, the screw on the pressing block is configured to connect to the clamping sliding side and drive the clamping sliding side to move; one of the frames the tensioning frame is a tensioning plate, and an upper pressing plate of tensioning plate is matched on the tensioning plate for clamping the steel plate; the remaining three frames of the tensioning frame are provided with grooves matching with the slider strip, and the tensioning frame is movably disposed on the slider strip, that is, the steel plate tensioning mechanism is movably disposed on the guide rail plate workpiece table by using the tensioning frame.

Further, the pedestal comprises a granite supporting base, a beam sliding rail, and a beam motor, and the granite supporting base is fixed on the base; the beam sliding rail is fixed to an upper end of the granite supporting base; the beam motor is vertically fixed to the upper end of the granite supporting base and is parallel to the position of the beam sliding rail; the pedestal further comprises a beam sliding plate, the beam sliding plate is movably disposed above the beam sliding rail and the beam motor, the beam sliding plate is configured to place the beam, and the beam motor provides power to the beam, so that the beam is capable of moving in a Y-axis direction on the beam sliding rail, so as to implement movement of the multi-function motion module on the pedestal; the pedestal further comprises a buffer, and the buffer is fixed on two ends of an upper surface of the pedestal and is capable of buffering movement of the multi-function motion module on the pedestal.

In the fully-automatic cutting and welding apparatus for stepped steel plate consistent with the present invention, a series of operations comprising cutting a steel plate step opening, cutting a soldering lug for manufacturing a steel plate step part, and welding the cut soldering lug at the steel plate step opening may be completed on a device by means of cooperation of a multi-function motion module, an automatic feed library turntable, a product flip platform, a steel plate supporting module, a pedestal, and a base, and fully automation is achieved.

The present invention further provides a fully-automatic cutting and welding method for stepped steel plate, and specific technical solutions of the method are as follows:

A fully-automatic cutting and welding method for stepped steel plate comprises the following steps:

S1: cutting a steel plate opening: placing a steel plate on a steel plate supporting module for clamping, then cutting a pattern opening for printing on the steel plate of single-thickness by using a focusing lens cutting and welding apparatus, and at the same time, a corresponding step opening is cut in an area of the steel plate in which a step part needs to be made;

S2: cutting a soldering lug: cutting a soldering lug that is stored in advance on an automatic feed library turntable by using the focusing lens cutting and welding apparatus, and cutting the soldering lug to obtain a step soldering lug with a size corresponding to that of the step opening;

S3: transferring the soldering lug: transferring the step soldering lug in step S2 from the automatic feed library turntable to a product flip platform by using a double-head suction cup, and after flipping and detecting the step soldering lug, then transferring the step soldering lug from the product flip platform to a step opening of the steel plate on the steel plate supporting module; and S4: soldering the soldering lug: seamlessly soldering the step soldering lug to the step opening of the steel plate of single-thickness by using the focusing lens cutting and welding apparatus, where a device for implementing the fully-automatic cutting and welding method for stepped steel plate comprises a multi-function motion module, an automatic feed library turntable, a product flip platform, a steel plate supporting module, a pedestal, and a base;

the multi-function motion module is provided with the focusing lens cutting and welding apparatus and the double-head suction cup and is capable of implementing cutting, welding, and transferring of a stepped steel plate, the multi-function motion module is movably disposed on the pedestal and is capable of performing motion in a Y-axis direction on the pedestal, so that the multi-function motion module is capable of moving to the above of the automatic feed library turntable, the product flip platform, and the steel plate supporting module at any time;

the pedestal is fixed on a surface edge of the base;

the automatic feed library turntable is configured to bear a soldering lug for manufacturing a steel plate step part and is fixed at one end of the base;

the product flip platform is disposed between the automatic feed library turntable and the steel plate supporting module, and functions as a transit platform, and is configured to buffer a step soldering lug already cut on the automatic feed library turntable; and the steel plate supporting module is fixed at the other end of the base for supporting and fixing a steel plate, and is used as a welding platform for the final steel plate step part.

Further, the soldering lug stored on the automatic feed library turntable may have thickness of a same specification or different specifications, and a soldering lug with a correspondingly adaptive specification thickness is selected according to the thickness of the steel plate in step Si to cut the needed step soldering lug; wherein a soldering lug thinner than the steel plate is configured to manufacture a thinning area of the stepped steel plate, and a soldering lug thicker than the steel plate is configured to manufacture a thickening area of the stepped steel plate.

Further, the multi-function motion module comprises a beam and an X-axis moving plate; an X-axis motor and a sliding rail are fixed on the beam; the motor provides power to motion of the X-axis moving plate; the X-axis moving plate is movably disposed on the beam by using the sliding rail and is capable of performing motion in an X-axis direction on the sliding rail; and the X-axis moving plate is provided with a Z-axis motor, a Z-axis sliding block, and a Z-axis moving plate, the Z-axis moving plate is movably disposed on the X-axis moving plate by using the Z-axis sliding block, and the Z-axis motor is capable of implementing motion of the Z-axis moving plate in a vertical direction; the focusing lens cutting and welding apparatus and the double-head suction cup are disposed on the Z-axis moving plate, and at the same time, a positioning camera and a height determining sensor are further provided on the Z-axis moving plate; the focusing lens cutting and welding apparatus is used for cutting and welding the steel plate and the step soldering lug; the double-head suction cup is fixed on both sides of the Z-axis moving plate and is configured to suck and grab the step soldering lug; the positioning camera is capable of implementing alignment of the steel plate and the step soldering lug; and the height determining sensor is configured to control distances from the positioning camera, the focusing lens cutting and welding apparatus, and the double-head suction cup to surfaces of a steel sheet and the step soldering lug.

Further, the automatic feed library turntable comprises a fixing plate and a soldering lug storage mechanism, and the fixing plate is configured to support and fix the soldering lug storage mechanism; the soldering lug storage mechanism comprises a soldering lug pedestal, a soldering lug platform, a motor, a speed reducer, and a motor base, the soldering lug pedestal has a regular cubic structure, the motor and the speed reducer cooperate to control rotation of the soldering lug pedestal, and the motor base functions as a joint between the fixing plate and the soldering lug storage mechanism; and the soldering lug platform comprises an air cylinder, an adsorption table, a platform substrate, a spacer block, a sliding module, and a soldering lug tensioning frame assembly; the soldering lug platform is fixed to side surfaces of the soldering lug pedestal by using the platform substrate; the air cylinder is directly fixed at a central position on one side of the platform substrate; the sliding module is located on a left side and a right side of the air cylinder and is fixed on the platform substrate; the spacer block is fixed on the other side of the platform substrate; the soldering lug tensioning frame assembly is configured to clamp the step soldering lug; two said soldering lug tensioning frame assemblies are provided on the soldering lug platform; one said soldering lug tensioning frame assembly is disposed above the air cylinder and the sliding module, and the soldering lug tensioning frame assembly is capable of sliding on the sliding module under driving of the air cylinder; and the other soldering lug tensioning frame assembly is fixed on the spacer block; the adsorption table is fixed to a middle part of the platform substrate, and the adsorption table is provided with a plurality of adsorption holes, which are capable of smoothly fixing the soldering lug on the adsorption table.

Further, the product flip platform comprises a fixing mechanism, a flip mechanism, and a camera module, and the fixing mechanism supports and fixes the flip mechanism;

the fixing mechanism comprises a side plate, a reinforcing rib, and a fixed bottom plate, the side plate is fixed on two sides of the fixed bottom plate, and the reinforcing rib is fixed between two said side plates; and the flip mechanism comprises a flip adsorption table, a fixed adsorption table, and a drive head, and the drive head penetrates through a middle part above the side plate by using a central shaft; one end of the flip adsorption table is fixed on the central shaft located between the two side plates, so that the flip adsorption table is capable of flipping 180° under driving of the drive head; one reinforcing rib is disposed below the other end of the flip adsorption table; the fixed adsorption table is fixed above two reinforcing ribs and is located on the other side of the central shaft; when flipping 180°, the flip adsorption table is located right above the fixed adsorption table; the flip adsorption table and the fixed adsorption table are both provided with a plurality of adsorption holes; and the camera module is fixed to an outer side of the side plate.

Further, the step soldering lug in step S3 is transferred onto the flip adsorption table of the product flip platform by using the double-head suction cup, the flip adsorption table flips for 180° and releases an adsorption force for the step soldering lug, and the fixed adsorption table increases an adsorption force so that the step soldering lug smoothly falls on the fixed adsorption table after flipping, to implement a flipping process of the step soldering lug in step S3; before being transferred by the double-head suction cup to a template supporting module, the step soldering lug on the fixed adsorption table passes through the above of the camera module, so that the camera module scans and positions the step soldering lug, to ensure accuracy of the position when the step soldering lug is transferred to the step opening of the steel plate on the steel plate supporting module.

Further, the steel plate supporting module comprises a guide rail plate workpiece table, a steel plate adsorption module, and a steel plate tensioning mechanism; the guide rail plate workpiece table is configured to support the steel plate tensioning mechanism, the guide rail plate workpiece table comprises a supporting frame and an operation window, and the steel plate tensioning mechanism is movably fixed in the operation window of the guide rail plate workpiece table; the steel plate tensioning mechanism is configured to clamp and release the steel plate; and the steel plate adsorption module is disposed below the operation window of the guide rail plate workpiece table in a belt transmission manner and is fixed on the base.

Further, the pedestal comprises a granite supporting base, a beam sliding rail, and a beam motor, and the granite supporting base is fixed on the base; the pedestal further comprises a beam sliding plate, the beam sliding plate is movably disposed above the beam sliding rail and the beam motor, the beam sliding plate is configured to place the beam, and the beam motor provides power to the beam, so that the beam is capable of moving in a Y-axis direction on the beam sliding rail, so as to implement movement of the multi-function motion module towards the above of the automatic feed library turntable, the product flip platform, and the steel plate supporting module on the pedestal.

In addition, during welding, a good welding seam can be formed only when a laser frequency and a welding speed need to effectively cooperate to achieve a certain laser spot overlap ratio. Usually, two spots have a good welding seam and the best crater at an overlap ratio of ⅓ to ½. Secondly, welding quality is very sensitive to a distance between the welding apparatus and the soldering lug, and a welding apparatus whose focusing is relatively fine needs to be used. Good welding effects require that the welding is secure, a soldering lug does not deform, a back surface does not have a welding track, a surface does not turn yellow, and a relatively great melt depth can be formed. A QCW pulse 150 W laser is used for welding in the present invention. Generally, a peak current is set to about 11% to 13%, a frequency is set to 50 Hz, a pulse width is set to 0.3 ms to 0.4 ms, a welding speed is relatively low and is usually approximately 3 mm/s to 5 mm/s, and inert gas argon is used for protection.

Some of additional aspects and advantages of the present invention are described in the following descriptions, and some become obvious from the following descriptions or are learned through practices of the present invention.

BRIEF DESCRIPTION OF THE DRAWINGS

The foregoing and/or additional aspects and advantages of the present invention become obvious and easily understood from the following descriptions of embodiments with reference to the accompanying drawings.

DESCRIPTION OF COMPONENT MARK NUMBERS

Figure 1:
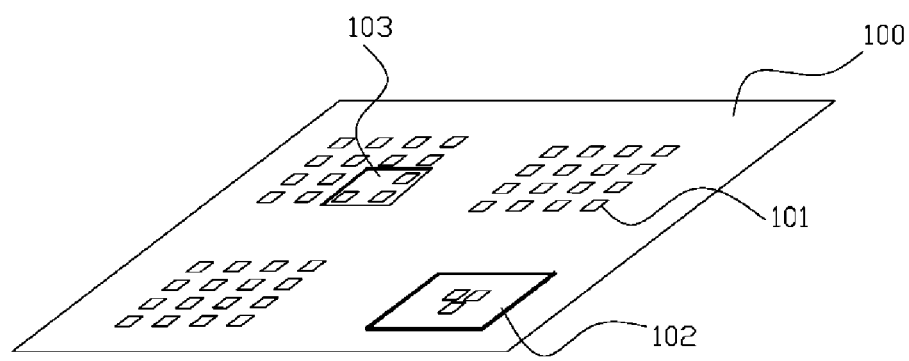
FIG. 1 is a schematic diagram of a stepped steel plate.

Wherein, 1: multi-function motion module, 2: automatic feed library turntable, 3: product flip platform, 4: steel plate supporting module, 5: pedestal, 6: base; 100: steel plate, 101: pattern opening on a steel plate, 102: thickening area of a steel plate, 103: thinning area of a steel plate, 1011: step opening, 2400: step soldering lug; 11: beam, 12: X-axis moving plate, 13: Z-axis moving plate, 15: anti-collision head, 16: miniature photoelectric sensor, 121: Z-axis motor, 122: Z-axis sliding block, 131: positioning camera, 132: focusing lens cutting and welding apparatus, 133: height determining sensor, 134: double-head suction cup, 141: X-axis motor, 142: sliding rail;

21: fixing plate, 22: soldering lug pedestal, 23: soldering lug platform, 24: soldering lug, 25: stepping motor, 26: motor base, 27: speed reducer, 211: fixing hole, 221: bearing, 231: air cylinder, 232: adsorption table, 233: platform pedestal, 234: spacer block, 235: sliding module, 236: tensioning frame pressure plate, 237: tensioning frame fixed side, 2321: adsorption hole;

31: side plate, 32: flip adsorption table, 33: fixed adsorption table, 34: drive head, 35: camera module, 36: reinforcing rib, 324: central shaft, 37: fixed bottom plate, 341: drive motor, 342: drive speed reducer;

41: guide rail plate workpiece table, 411: workpiece frame, 412: top block, 413: brake, 414: supporting leg, 415: supporting block, 416: workpiece sliding rail, 417: slider strip, 418: air cylinder, 4131: brake handle;

42: steel plate adsorption module, 421: adsorption base plate, 422: adsorption supporting table, 423: adsorption bottom plate, 424: transmission guide rail, 425: transmission sliding block, 426: synchronous belt, 427: transmission motor, 428: synchronous belt pressure plate;

43: steel plate tensioning frame mechanism, 431: tensioning frame, 432: tensioning plate, 433: clamping sliding side, 434: pressing block, 4321: upper pressing plate of tensioning plate;

51: granite supporting base, 52: beam sliding plate, 53: beam sliding rail, 54: beam motor, 55: buffer.

DETAILED DESCRIPTION OF THE PREFERRED EMBODIMENTS

The following describes embodiments of the present invention in detail. Examples of the embodiments are shown in the accompanying drawings, and numerals that are the same or similar throughout represent the same or similar elements or elements having the same or similar functions. The following embodiments described with reference to the accompanying drawings are exemplary, are merely used to explain the present invention, and should not be construed as a limitation to the present invention.

In description of the present invention, it should be understood that orientation or position relationships indicated by terms "up", "down", "bottom", "top", "front", "rear", "inside", "outside", "horizontal", "vertical", or the like are orientation or position relationships shown based on the accompanying drawings, are only for the purpose of describing the present invention and simplifying the description, do not indicate or imply that indicated apparatuses or elements necessarily have particular orientations or are necessarily constructed and operated at particular orientations, and therefore should not be construed as a limitation to the present invention.

The present invention provides a fully-automatic cutting and welding apparatus for stepped steel plate.

Figure 2:
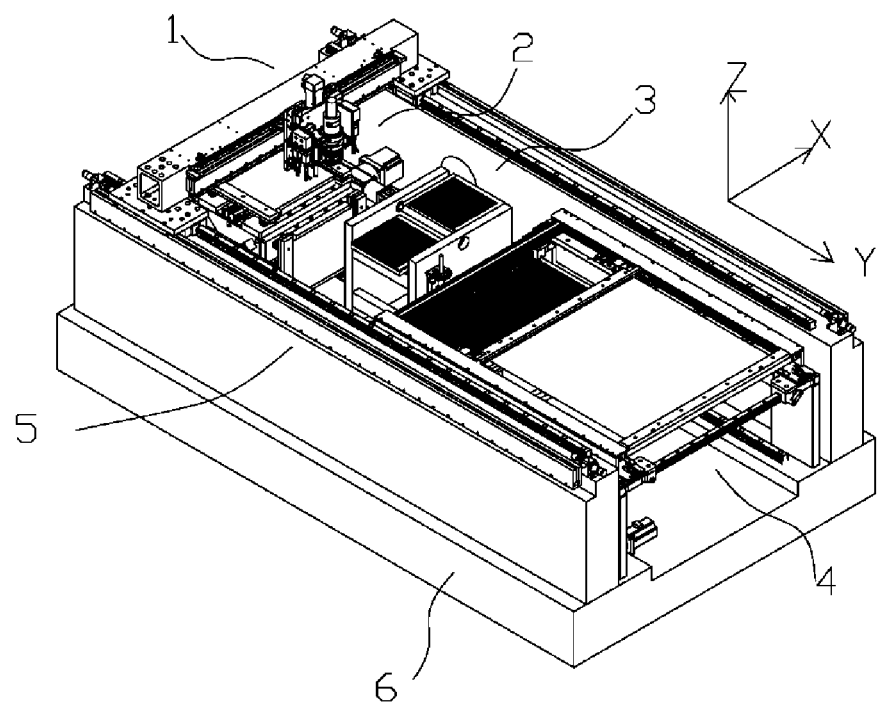
FIG. 2 is an overall schematic diagram of a fully-automatic cutting and welding apparatus for stepped steel plate.

A fully-automatic cutting and welding apparatus for stepped steel plate is shown in FIG. 2. A series of operations comprising cutting a steel plate step opening 1011, cutting a step soldering lug 2400 for manufacturing a steel plate step part, and welding the step soldering lug 2400 at the steel plate step opening may be completed on a device by means of cooperation of a multi-function motion module 1, an automatic feed library turntable 2, a product flip platform 3, a steel plate bearing module 4, a pedestal 5, and a base 6, and full automation is achieved. The multi-function motion module 1 is capable of implementing cutting and welding of a stepped steel plate and is movably disposed on the pedestal 5. The pedestal 5 is fixed on a surface edge of the base 6. The automatic feed library turntable 2 is configured to bear a soldering lug for manufacturing a steel plate step part and is fixed at one end of the base 6. The product flip platform 3 is disposed between the automatic feed library turntable 2 and the steel plate bearing module 4, and functions as a transit platform, and is configured to buffer a soldering lug already cut on the automatic feed library turntable 2. The steel plate bearing module 4 is fixed at the other end of the base 6 for bearing and fixing a steel plate, and is used as a welding platform for the final steel plate step part.

More specific implementations of the present invention are specifically provided below.

Figure 3:
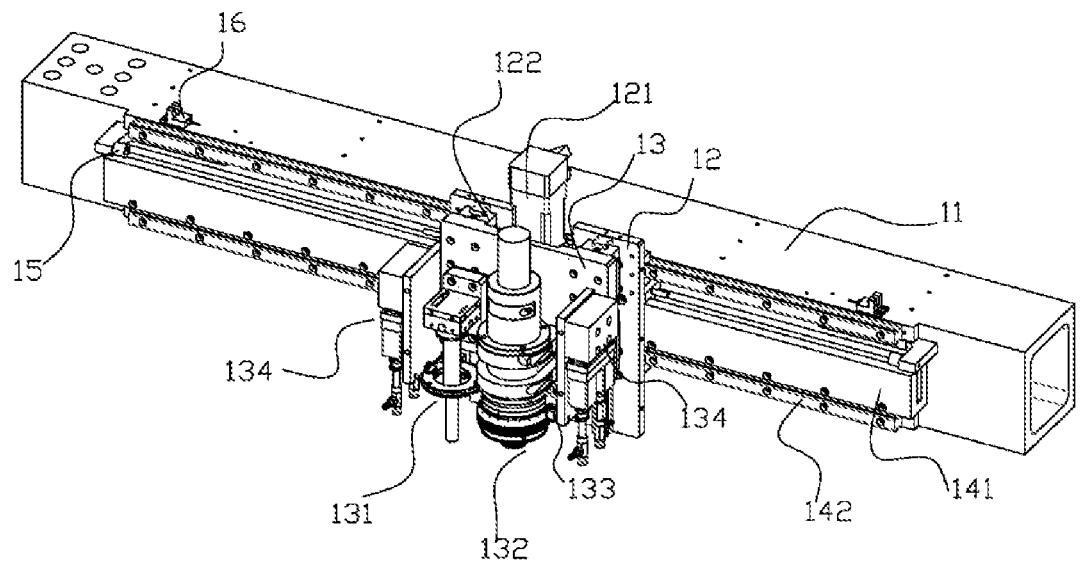
FIG. 3 is an overall schematic diagram of a multi-function motion module.

FIG. 3 is an overall schematic diagram of the multi-function motion module 1. The multi-function motion module 1 comprises a beam 11 and an X-axis moving plate 12. The beam 12 in this application is preferably designed as a cuboid. An X-axis motor 141 and two sliding rails 142 are fixed on a vertical side surface of the beam 11. The X-axis motor 141 is located between the two sliding rails 142. To facilitate fixing of the X-axis moving plate 12, the X-axis motor 141 has a groove shape. Therefore, a sliding block matching with the X-axis motor 141 and the sliding rails 142 is provided on a fixed surface of the X-axis moving plate 12, so as to perform a natural connection. In this case, the X-axis motor 141 provides power to motion of the X-axis moving plate 12, so that the X-axis moving plate 12 performs reciprocating motion in an X-axis direction on the sliding rails 142. In addition, an edge of an upper surface (that is, another surface closely adjacent to a side surface provided with the sliding rails 142 and the X-axis motor 141) of the beam 11 is provided with two miniature photoelectric sensors 16. The miniature photoelectric sensor 16 is configured to sense and position a motion position of the X-axis moving plate 12 on the sliding rails 142. In addition, an anti-collision head 15 is fixed at two endpoints of the X-axis motor 141, and the anti-collision head 15 can prevent the X-axis moving plate 12 from sliding out of a track during motion while buffering motion of the X-axis moving plate 12.

The X-axis moving plate 12 is provided with a Z-axis motor 121, a Z-axis sliding block 122, and a Z-axis moving plate 13, the Z-axis moving plate 13 is movably disposed on the X-axis moving plate 12 by using the Z-axis sliding block 122, and the Z-axis motor 121 is capable of implementing vertical motion of the Z-axis moving plate 13 in a Z-axis direction; a positioning camera 131, a focusing lens cutting and welding apparatus 132, a height determining sensor 133, and a double-head suction cup 134 are configured in parallel on the Z-axis moving plate 13. There are two double-head suction cups 134 that are respectively fixed to two sides of the Z-axis moving plate 13. When a soldering lug that needs to be sucked and grabbed has a small size, only the double-head suction cup 134 on one side needs to be used. When a soldering lug that needs to be sucked and grabbed has a large size, the double-head suction cups 134 on two sides need to be used. The positioning camera 131 is capable of implementing alignment of the steel plate and the soldering lug, so that the focusing lens cutting and welding apparatus 132 performs accurate cutting and welding operations on the steel plate and the soldering lug; the height determining sensor 133 is configured to control distances from the positioning camera 131, the focusing lens cutting and welding apparatus 132, and the double-head suction cup 134 to surfaces of a steel sheet and the soldering lug; and the double-head suction cup 134 is configured to suck and grab the soldering lug. That is, when sucked and grabbed by the double-head suction cup 134, the cut soldering lug that is on the automatic feed library turntable 2 and that is shown in FIG. 4 moves to the product flip platform 3 shown in FIG. 8 for flipping, sweeping, and positioning; the cut soldering lug moves from the product flip platform 3 to the steel plate bearing module 4 shown in FIG. 11 again after being sucked and grabbed, so that the transferred cut soldering lug is welded to a position corresponding to the steel plate by using the focusing lens cutting and welding apparatus 132, to form a needed stepped steel plate.

In this embodiment of this application, one multi-function motion module 1 is provided. However, in other embodiments, one fully-automatic cutting and welding apparatus for stepped steel plate may have two multi-function motion modules 1, so that a cutting operation of the soldering lug for manufacturing the steel plate step part and a cutting operation of the steel plate opening are synchronously performed, thereby further increasing working efficiency. Therefore, a cutting and welding apparatus having two multi-function motion modules 1 also falls within a protection scope of the present invention.

Figure 4:
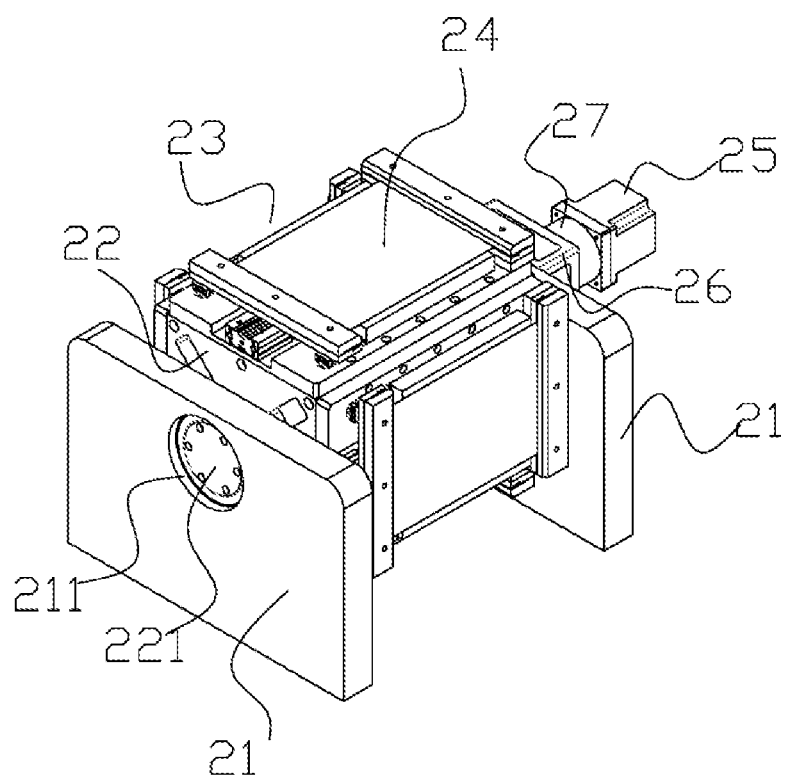
FIG. 4 is an overall schematic diagram of an automatic feed library turntable.
Figure 5:
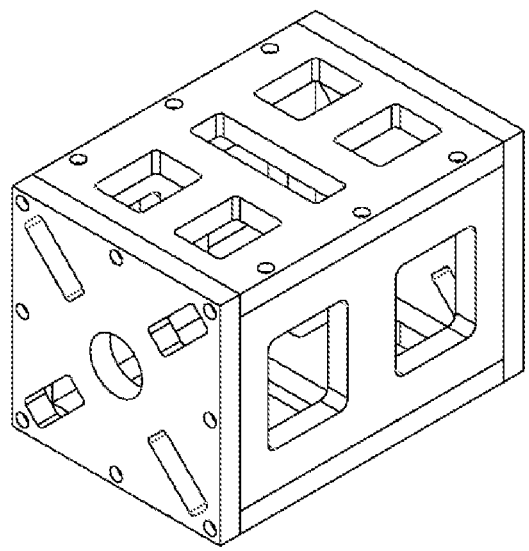
FIG. 5 is a schematic diagram of a soldering lug pedestal of an automatic feed library turntable.

An overall schematic diagram of the automatic feed library turntable 2 is shown in FIG. 4. The automatic feed library turntable 2 comprises a fixing plate 21 and a soldering lug storage mechanism; the fixing plate 21 is provided with a fixing hole 211, is vertically disposed on two sides of the soldering lug storage mechanism, and is configured to support and fix the soldering lug storage mechanism; the soldering lug storage mechanism is fixed on the base 6; the soldering lug storage mechanism comprises a soldering lug pedestal 22, a soldering lug platform 23, a motor 25, a speed reducer 27, and a motor base 26. The soldering lug pedestal 22 shown in FIG. 5 has a regular cubic structure and is preferably a cuboid structure in this application, the interior thereof is hollow, and openings of certain shapes are provided on surfaces. Because the interior of the soldering lug pedestal 22 requires arrangements of a related control circuit and gas pipe, it is not described in detail herein as an implicit internal common condition of normal operation of the device. This does not affect structure functions of the entire device. The central shaft that connects the motor 25 and the speed reducer 27 penetrates through two bottom surfaces of the soldering lug pedestal 22, to drive the soldering lug pedestal 22 to rotate. The motor 25 provides a torque force, and the speed reducer 27 may slow down while further increasing the torque force. One side of the soldering lug pedestal 22 which is provided with the motor 25 and the speed reducer 27 is fixed to the fixing plate 21 by using the motor base 26, and the other side is nested on the fixing hole 211 of another fixing plate 21 by using the bearing 221. Four side surfaces of the soldering lug pedestal 22 are separately provided with a soldering lug platform 23. The soldering lugs 24 of different specifications are placed on each soldering lug platform 23. When the step part for manufacturing the steel plate needs a soldering lug of a specific specification, the soldering lug pedestal 22 automatically selects to rotate a soldering lug platform 23 in which the soldering lug of the corresponding specification is contained to the top, so that the multi-function motion module 1 performs a cutting operation on the soldering lug 24. Therefore, the soldering lug pedestal 22 may select regular cubes with different shapes according to types of the soldering lugs.

Figure 6:
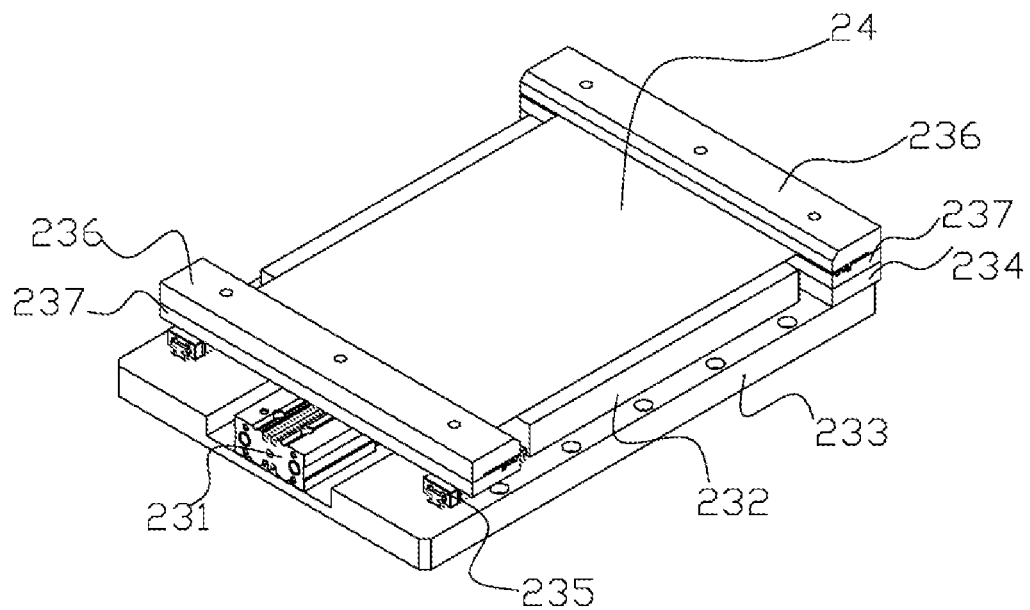
FIG. 6 is a schematic diagram of a soldering lug platform of an automatic feed library turntable with a soldering lug.
Figure 7:
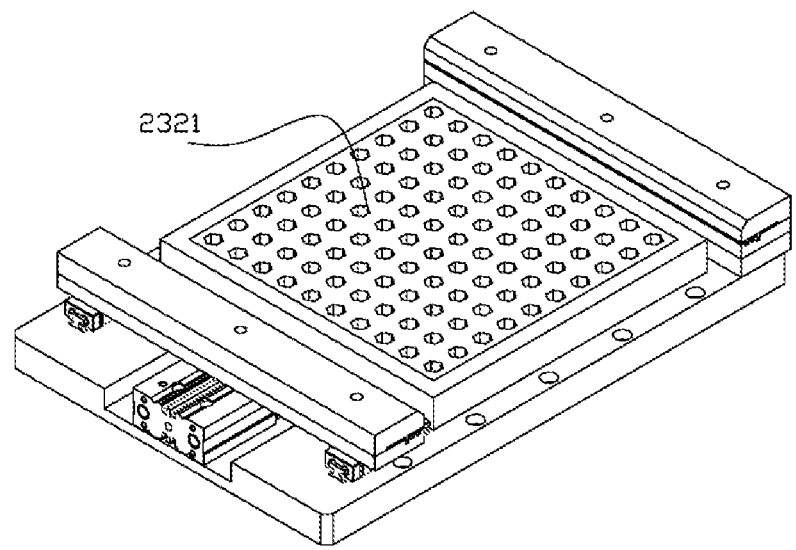
FIG. 7 is a schematic diagram of a soldering lug platform of an automatic feed library turntable with no soldering lug.
Figure 8:
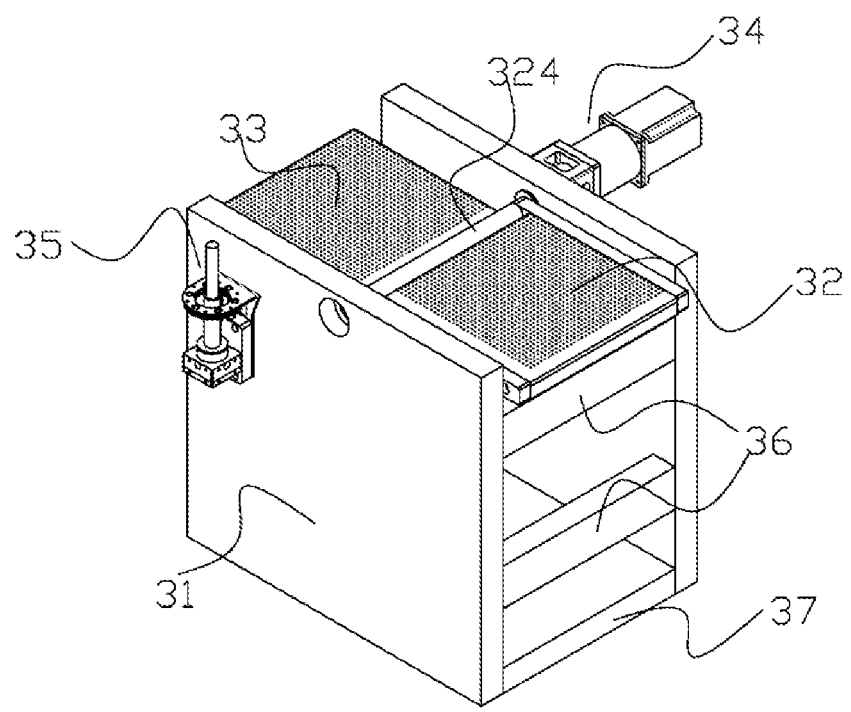
FIG. 8 is an overall schematic diagram of a product flip platform.
Figure 9:
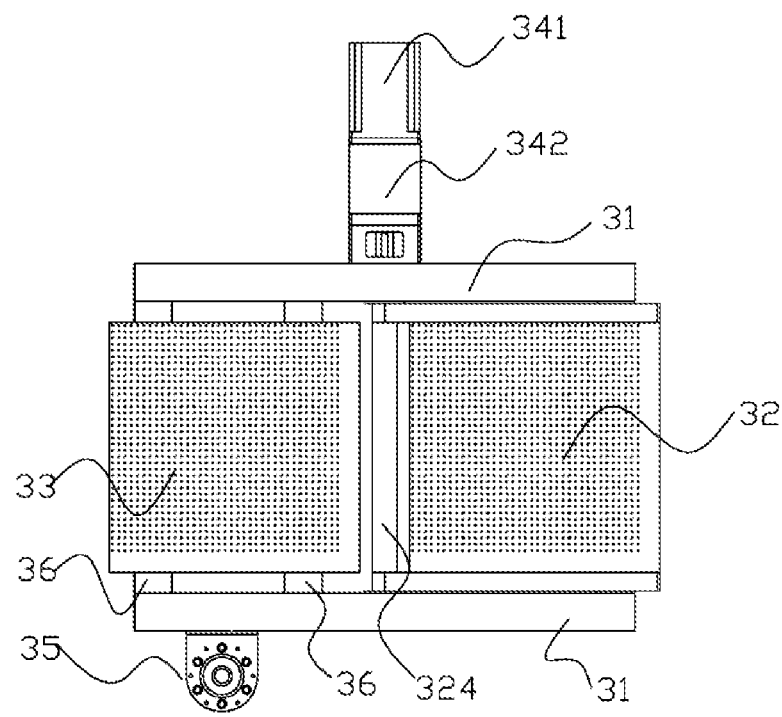
FIG. 9 is a top view of a product flip platform.
Figure 10:
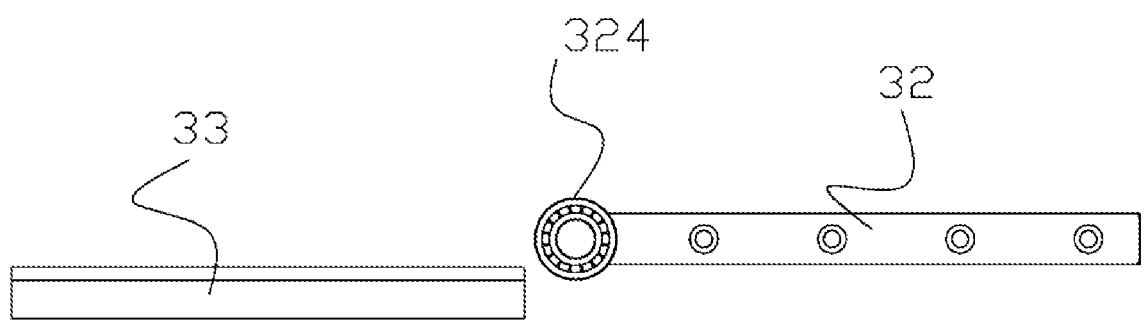
FIG. 10 is a schematic diagram of positions of a flip adsorption table and a fixed adsorption table.

The soldering lug platform 23 shown in FIG. 6 comprises an air cylinder 231, an adsorption table 232, a platform substrate 233, a spacer block 234, a sliding module 235, and a soldering lug tensioning frame assembly; the soldering lug platform 23 is fixed to a side surface of the soldering lug pedestal 22 by using the platform substrate 233; the adsorption table 232 is fixed to a middle part of the platform substrate 233; the adsorption table 232 shown in FIG. 7 is provided with a plurality of adsorption holes, which are capable of smoothly adsorbing the soldering lug 24 on the adsorption table 232; the air cylinder 231 is located on one side of the adsorption table 232 and is directly fixed on the platform substrate 233; on the same side of the adsorption table 232, as well as on two sides of the air cylinder 231, the sliding module 235 is fixed on the platform substrate 233; on the other side of the adsorption table 232, the spacer block 234 is fixed to an edge of the platform substrate 233; the soldering lug tensioning frame assembly is configured to clamp and tighten the soldering lug for manufacturing the steel plate step part and comprises a tensioning frame pressure plate 236 and a tensioning frame fixed side 237; the tensioning frame pressure plate 236 is movably disposed above the tensioning frame fixed side 237 and helps the soldering lug 24 be put in and taken out; wherein there are two soldering lug tensioning frame assemblies; one soldering lug tensioning frame assembly is disposed above the air cylinder 231 and the sliding module 235 by using the tensioning frame fixed side 237, and the soldering lug tensioning frame assembly is fixed to a moving end of the air cylinder 231 and is capable of sliding on the sliding module 235 under driving of the air cylinder 231; and the other soldering lug tensioning frame assembly is fixed on the spacer block 234 by using the tensioning frame fixed side 237; during use, the soldering lug 24 is kept flat on the adsorption table 232, two ends of the soldering lug 24 is clamped by the soldering lug tensioning frame assemblies, wherein one soldering lug tensioning frame assembly remains still, and the other soldering lug tensioning frame assembly is stretched to an outer side under driving of the moving end of the air cylinder 231, so that the soldering lug 24 is tightened and smoothed, and at the same time, the adsorption table 232 adsorbs and closely adheres the soldering lug 24 to the adsorption table 232. An overall schematic diagram of the product flip platform 3 is shown in FIG. 8. The product flip platform 3 comprises a fixing mechanism, a flip mechanism, and a camera module 35; the fixing mechanism comprises a side plate 31, a reinforcing rib 36, and a fixed bottom plate 37, the side plate 31 is fixed on two sides of the fixed bottom plate 37, and the reinforcing rib 36 is fixed between two side plates 31. The number of reinforcing ribs 36 is determined according to requirements. The fixing mechanism supports and fixes the flip mechanism. Referring to both FIG. 9 and FIG. 10, the flip mechanism comprises a flip adsorption table 32, a fixed adsorption table 33, and a drive head 34, and the drive head 34 penetrates through a middle part above the side plate 31 by using a central shaft 324; the drive head 34 is capable of driving the central shaft 324 to rotate and comprises a drive motor 341 and a drive speed reducer 342; wherein the drive motor 341 provides a rotation torque force, and the drive motor 341 may reduce a rotation speed while further increasing the rotation torque force; one end of the flip adsorption table 32 is fixed on the central shaft 324 located between the two side plates 31, so that the flip adsorption table 32 is capable of flipping 180° under driving of the central shaft 324; at the same time, one reinforcing rib 36 is disposed below the other end of the flip adsorption table 32, to avoid that the other end of the flip adsorption table 32 is in a suspending state; the fixed adsorption table 33 is fixed above two reinforcing ribs 36 and is located on the other side of the central shaft 324; when flipping 180°, the flip adsorption table 32 is located right above the fixed adsorption table 33. Refer to FIG. 10 for a position relationship between the fixed adsorption table 33 and the flip adsorption table 32 when they do not operate. In addition, the flip adsorption table 32 and the fixed adsorption table 33 are both provided with a plurality of adsorption holes, which are configured to adsorb the cut soldering lug transmitted from the automatic feed library turntable 2; and the camera module 35 is fixed to an outer side of the side plate 31. When the device operates, the double-head suction cup 133 on the multi-function motion module 1 sucks and grabs the cut soldering lug on the automatic feed library turntable 2 and moves the soldering lug to the above of the flip adsorption table 32. The double-head suction cup 133 releases a suction force for the soldering lug so that the soldering lug falls on the flip adsorption table 32 and is adsorbed and fixed by the flip adsorption table 32, then the soldering lug is flipped for 180° by using the flip adsorption table 32 and falls on the fixed adsorption table 33, then the double-head suction cup 133 on the multi-function motion module 1 sucks and grabs the soldering lug so that the camera module 35 scans the soldering lug, to further detect quality of the soldering lug, a position at which the soldering lug is sucked and grabbed is determined, and it is ensured that the soldering lug accurately corresponds to an opening position of the cut step part on the steel plate clamped by the steel plate bearing module 5. In some embodiments, the camera module 35 may be a CCD camera or a camera device having a similar function.

Figure 11:
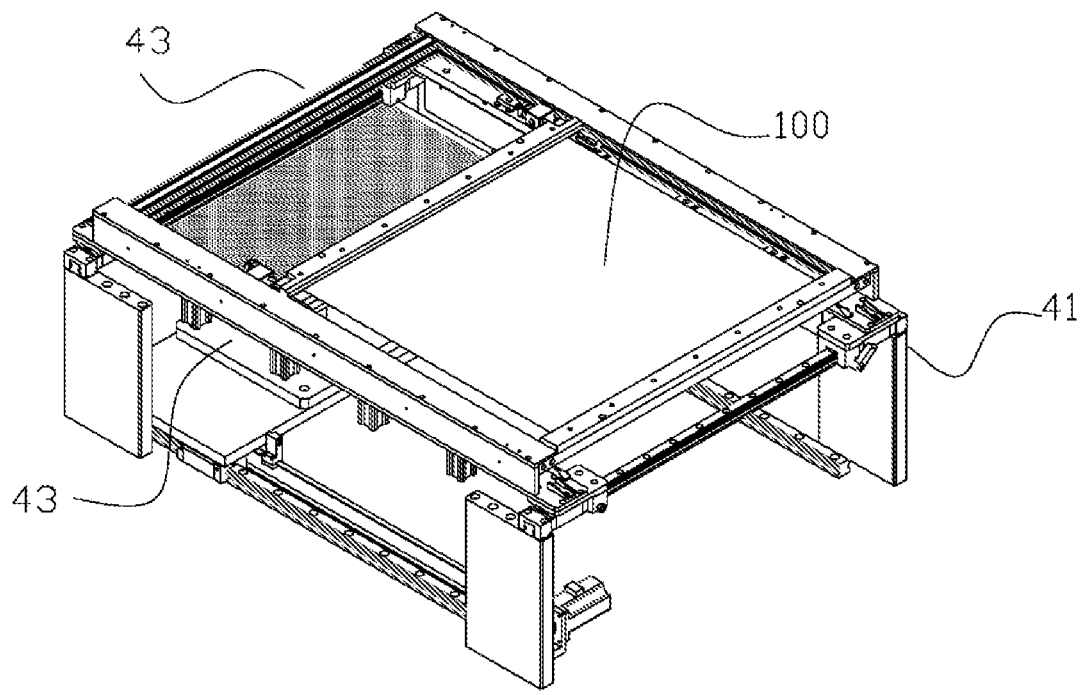
FIG. 11 is an overall schematic diagram of a steel plate supporting module.

An overall schematic diagram of the steel plate bearing module 4 is shown in FIG. 11. The steel plate bearing module 4 comprises a guide rail plate workpiece table 41, a steel plate adsorption module 42, and a steel plate tensioning mechanism 43; the guide rail plate workpiece table 41 comprises a supporting frame and an operation window, and the steel plate tensioning mechanism 43 is movably fixed in the operation window of the guide rail plate workpiece table 41; and the steel plate adsorption module 42 is disposed below the operation window of the guide rail plate workpiece table 41 and is fixed on the base 6.

Figure 12:
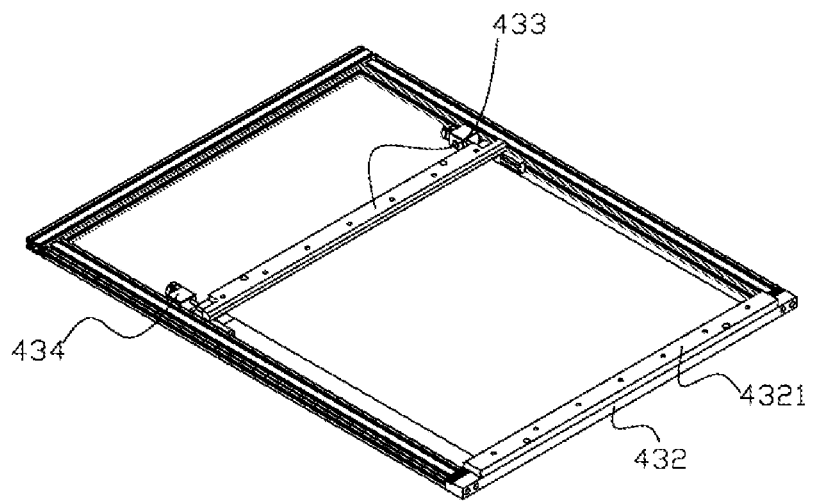
FIG. 12 is a schematic diagram of a steel plate tensioning mechanism.
Figure 13:
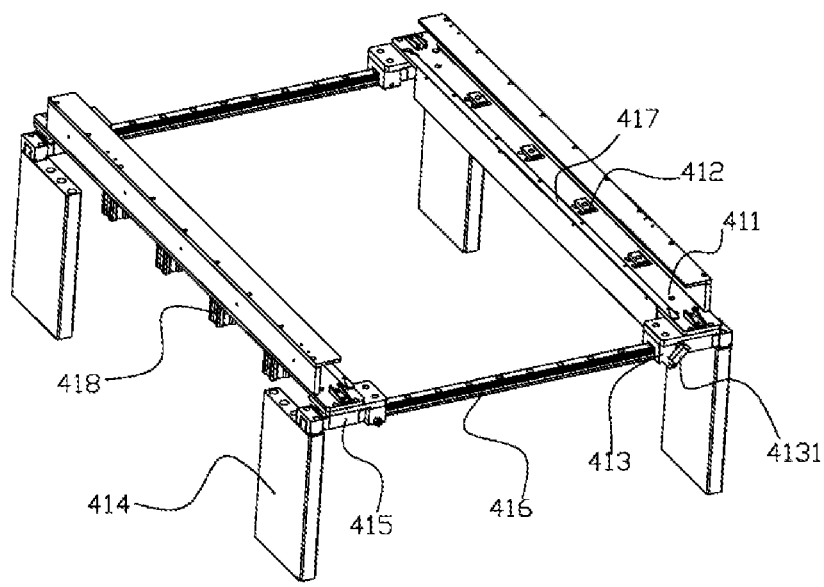
FIG. 13 is a schematic diagram of a guide rail plate workpiece table.

As shown in FIG. 13, the supporting frame of the guide rail plate workpiece table 41 comprises supporting legs 414, workpiece sliding rails 416, a supporting block 415, and a brake 413. There are four supporting legs 414 that are directly fixed on the base 6; there are two workpiece sliding rails 416 that are separately fixed on two of the supporting legs 414 and form two opposite sides of the rectangular supporting frame; the supporting block 415 is provided with a groove matching with the workpiece sliding rail 416 and is movably disposed at four endpoints of the workpiece sliding rail 416; and the brake 413 and the supporting block 415 are connected together and both disposed on the workpiece sliding rail 416. The operation window is a rectangular window formed by a workpiece frame 411 and the workpiece sliding rail 416 that are disposed on two sides of the workpiece sliding rail 416. Specifically, the workpiece frame 411 is fixed on the supporting block 415 and is capable of moving on the workpiece sliding rail 416 along with the supporting block 415. In this case, the brake 413 can control the supporting block 415 to be fixed at a particular position, that is, control the position of the workpiece frame 411. In addition, a plurality of top blocks 412 are arranged above the workpiece frame 411; a plurality of top block air cylinders 418 are arranged below the workpiece frame 411; one top block air cylinder 418 adapts to one of the said top blocks 412, and the top block air cylinder 418 is capable of driving the top block 412 to perform lifting motion on the workpiece frame 411, and a slider strip 417 parallel to the top block 412 is further disposed above the workpiece frame 411. After the steel plate tensioning mechanism 43 shown in FIG. 12 is movably disposed on the workpiece frame 411 of the guide rail plate workpiece table 41 by using the slider strip 417, and the steel plate tensioning mechanism 43 is placed on the slider strip 417, the top block air cylinder 418 drives the top block 412 to raise the steel plate tensioning mechanism 43 up to rise to an upper surface of the workpiece frame 411, thereby fixing the steel plate tensioning mechanism 43 so that the steel plate tensioning mechanism 43 does not shake during use.

An overall schematic diagram of the steel plate tensioning mechanism 43 is shown in FIG. 12. The steel plate tensioning mechanism 43 comprises a tensioning frame 431 and a clamping sliding side 433; the tensioning frame 431 is a rectangular frame; two endpoints of the clamping sliding side 433 are movably disposed on two frames of the tensioning frame 431; a pressing block 434 is fixed on the tensioning frame 431; the pressing block 434 is provided with a screw, the screw on the pressing block 434 is configured to connect to the clamping sliding side 433 and drive the clamping sliding side 433 to move; one of the frames of the tensioning frame 431 is a tensioning plate 432, and an upper pressing plate of tensioning plate 4321 is matched on the tensioning plate 432 for clamping the steel plate; the remaining three frames of the tensioning frame 431 are provided with grooves matching with the slider strip 417; aluminum is preferably selected in this application to manufacture the remaining three frames of the tensioning frame 431, and aluminum may more conveniently make the tensioning frame 431 movably disposed on the slider strip 417, that is, the steel plate tensioning mechanism 43 is movably disposed on the guide rail plate workpiece table 41 by using the tensioning frame 431. During use, the steel plate is kept flat on the tensioning frame 431, and one side of the steel plate is clamped by the tensioning plate 432 and the upper pressing plate of tensioning plate 4321, the other side is clamped by the clamping sliding side 433, then the screw on the pressing block 434 drives the clamping sliding side 433 to be stretched to an outer side of the steel plate, so that the steel plate is tightened and smoothed.

Figure 14:
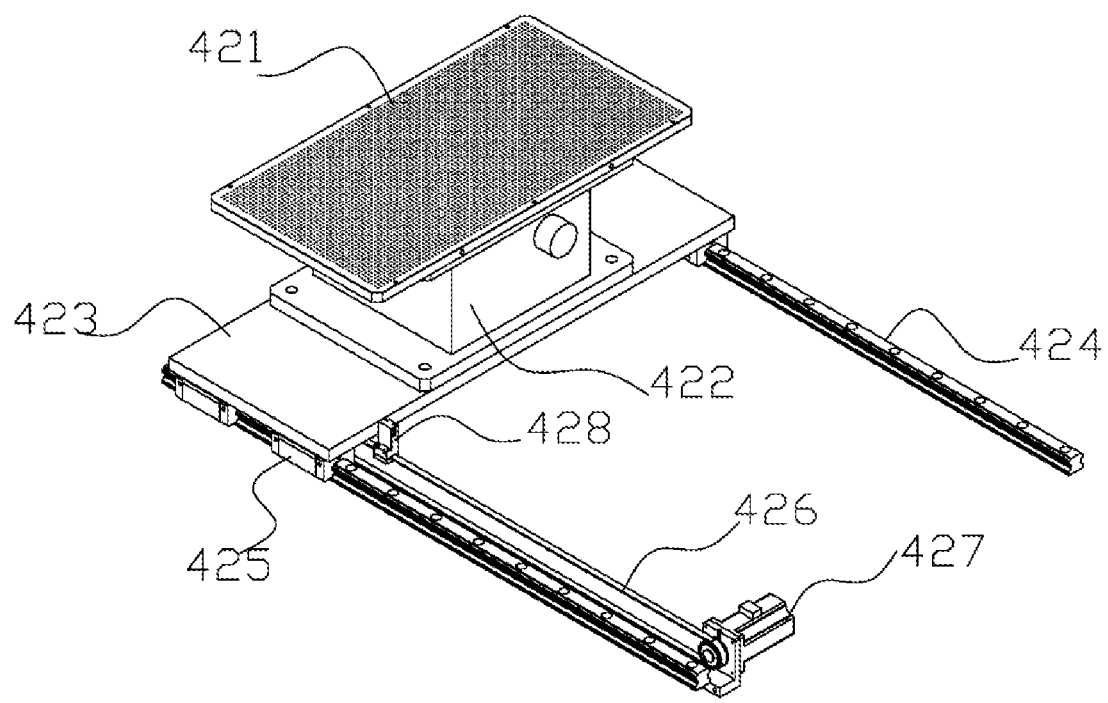
FIG. 14 is a schematic diagram of a steel plate adsorption module.

The steel plate adsorption module 42 is shown in FIG. 14. The steel plate adsorption module 42 comprises a steel plate adsorption table and a transmission mechanism, the steel plate adsorption table comprises an adsorption base plate 421, an adsorption supporting table 422, and an adsorption bottom plate 423, the adsorption base plate 421 is provided with a plurality of adsorption holes, configured to adsorb the steel plate so that the steel plate becomes smooth; the adsorption base plate 421 is fixed on the adsorption supporting table 422; and the adsorption supporting table 422 is fixed on the adsorption bottom plate 423; and the transmission mechanism comprises a transmission guide rail 424 and a transmission sliding block 425, the transmission sliding block 425 matches with the transmission guide rail 424, and the transmission guide rail 424 is fixed on the base 6; the adsorption bottom plate 423 is fixed to the transmission sliding block 425 and is capable of moving on the transmission guide rail 424 along with the transmission sliding block 425; a transmission manner of the transmission mechanism is belt transmission; the transmission mechanism further comprises a transmission motor 427 and a synchronous belt 426 matching with the motor 427, and one side of the synchronous belt 426 is fixed to the adsorption bottom plate 423 by using a synchronous belt pressure plate 428. When the transmission motor 427 drives the synchronous belt 426 to operate, the synchronous belt 426 drives the whole steel plate adsorption table to move on the transmission guide rail 424; during use, the whole steel plate adsorption table moves to the below of the steel plate in the operation window and adsorbs the steel plate onto the adsorption base plate 421, so as to further ensure smoothness of the steel plate.

Figure 15:
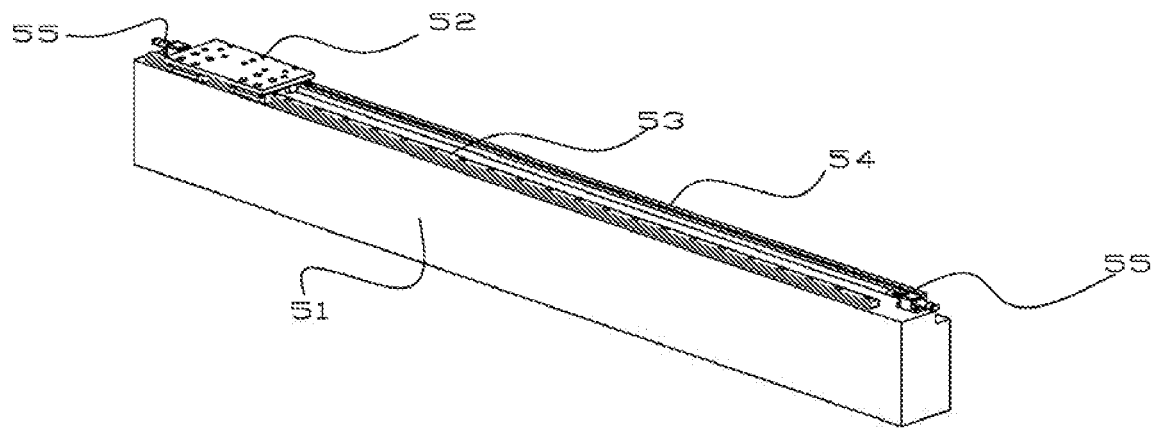
FIG. 15 is an overall schematic diagram of a pedestal.

An overall schematic diagram of the pedestal 5 is shown in FIG. 15. The pedestal 5 comprises a granite supporting base 51, a beam sliding rail 53, and a beam motor 54, and the granite supporting base 51 is fixed on two sides of the base 6; the beam sliding rail 53 is fixed to an upper end of the granite supporting base 51; the beam motor 54 is vertically fixed to the upper end of the granite supporting base 51 and is parallel to the position of the beam sliding rail 53; the pedestal 5 further comprises a beam sliding plate 52, the beam sliding plate 52 is movably disposed above the beam sliding rail 53 and the beam motor 54, the beam sliding plate 52 is configured to place the beam 11, and the beam motor 54 provides power to the beam 11, so that the beam 11 is capable of moving in a Y-axis direction on the beam sliding rail 53, so as to implement motion of the multi-function motion module 1 on the pedestal 5. During use of the device in the present invention, the multi-function motion module 1 moves to a corresponding position according to operation demands. This comprises that the multi-function motion module 1 moves to the above of the steel plate bearing module 4 on the pedestal 5 to cut the steel plate opening, moves to the above of the automatic feed library turntable 2 to cut the soldering lug for manufacturing the steel plate step part, and then moves to the product flip platform 3 to transit the cut soldering lug, transfers the soldering lug to a relative position of the steel plate on the steel plate bearing module 4, and welds the soldering lug onto the steel plate. In addition, the pedestal 5 further comprises a buffer 55, and the buffer is fixed on two ends of an upper surface of the pedestal 5 and is capable of buffering movement of the multi-function motion module 1 on the pedestal 5.

The present invention further provides a fully-automatic cutting and welding method for stepped steel plate.

Figure 16:
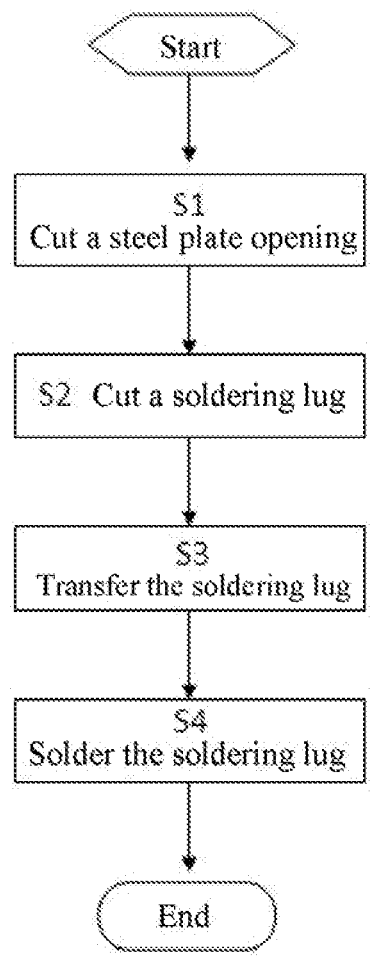
FIG. 16 is a flowchart of a fully-automatic cutting and welding method for stepped steel plate.

A fully-automatic cutting and welding method for stepped steel plate is provided with reference to the apparatus described in the above. As shown in FIG. 16, the method comprises the following steps.

Figure 17:
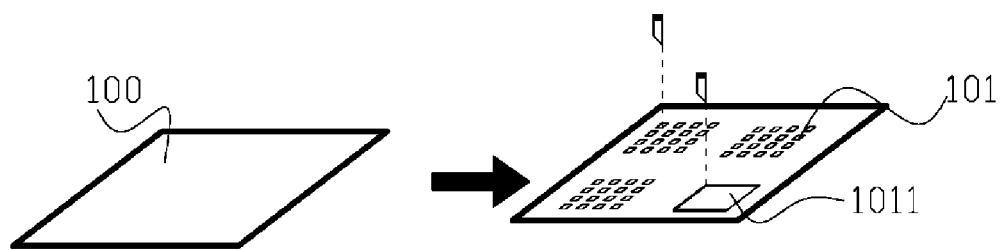
FIG. 17 is a schematic diagram of a process of cutting a steel plate pattern opening and a step opening in a fully-automatic cutting and welding method for stepped steel plate.

S1: Cut a steel plate opening: place a steel plate 100 on a steel plate tensioning mechanism 43 of a steel plate bearing module 4 for tightening and clamping; after moving to the above of the steel plate bearing module 4 on a pedestal 5, as shown in FIG. 17, a multi-function motion module 1 cuts a pattern opening 101 for printing on the steel plate 100 of single-thickness by using a focusing lens cutting and welding apparatus 132, and at the same time, a corresponding step opening 1011 is cut in an area of the steel plate in which a step part needs to be made.

After step S1 is completed, the multi-function motion module 1 moves from the above of the steel plate bearing module 4 to the above of an automatic feed library turntable 2 on the pedestal 5, and step S2 is performed.

S2: Cut a soldering lug: cut a soldering lug 24 that is stored in advance on an automatic feed library turntable 2 by using the focusing lens cutting and welding apparatus 132, and cut the soldering lug 24 to obtain a step soldering lug 2400 with a size corresponding to that of the step opening 1011.

S3: Transfer the soldering lug: transfer the step soldering lug 2400 in step S2 from the automatic feed library turntable 2 to the above of a product flip platform 3 by using a double-head suction cup 134 on the multi-function motion module 1. In this case, the double-head suction cup 133 releases a suction force for the step soldering lug 2400 so that the soldering lug falls on the flip adsorption table 32 and is adsorbed and fixed by the flip adsorption table 32, then the step soldering lug 2400 is flipped for 180° by using the flip adsorption table 32 and falls on the fixed adsorption table 33, then the double-head suction cup 133 on the multi-function motion module 1 sucks and grabs the soldering lug so that the camera module 35 scans the soldering lug, to further detect quality of the step soldering lug 2400, a position at which the step soldering lug 2400 is sucked and grabbed is determined, then the step soldering lug 2400 is transferred from the product flip platform 3 to the step opening 1011 of the steel plate on the steel plate bearing module 4, and it is ensured that the flipped and detected step soldering lug 2400 is accurately aligned with the step opening 1011.

When the step soldering lug 2400 falls at the step opening 1011, the double-head suction cup 133 releases a suction force for the step soldering lug 2400. In this case, the step soldering lug 2400 is adsorbed and fixed by a steel plate adsorption table of the steel plate adsorption module 42, and then step S4 is performed.

S4: Weld the soldering lug: referring to FIG. 18, seamlessly weld the step soldering lug 2400 to the step opening 1011 of the steel plate 100 of single-thickness by using the focusing lens cutting and welding apparatus 132 on the multi-function motion module 1.

During welding, a good welding seam can be formed only when a laser frequency and a welding speed need to effectively cooperate to achieve a certain laser spot overlap ratio. Usually, two spots have a good welding seam and the best crater at an overlap ratio of ⅓ to ½. Secondly, welding quality is very sensitive to a distance between the welding apparatus and the soldering lug, and a welding apparatus whose focusing is relatively fine needs to be used. Good welding effects require that welding is secure, a soldering lug does not deform, a back surface does not have a soldering track, a surface does not turn yellow, and a relatively great melt depth can be formed. A QCW pulse 150 W laser is used for welding in the present invention. Generally, a peak current is set to about 11% to 13%, a frequency is set to 50 Hz, a pulse width is set to 0.3 ms to 0.4 ms, a welding speed is relatively low and is usually approximately 3 mm/s to 5 mm/s, and inert gas argon is used for protection.

Figure 18:
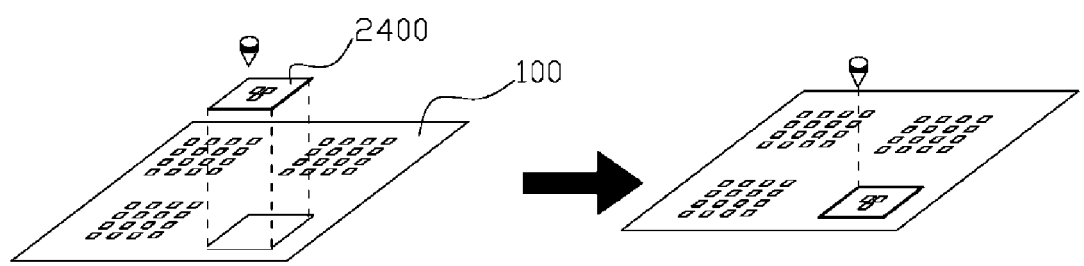
FIG. 18 is a schematic diagram of a process of welding a step soldering lug to a steel plate step opening in a fully-automatic cutting and welding method for stepped steel plate.

In addition, it should be noted that the soldering lug 24 stored on the automatic feed library turntable 2 may have thickness of a same specification or different specifications, and a soldering lug 24 with a correspondingly adaptive specification thickness is selected according to the thickness of the steel plate 100 in step S1 to cut the needed step soldering lug 2400; wherein, a soldering lug 24 thinner than the steel plate 100 is configured to manufacture a thinning area of the stepped steel plate, and a soldering lug 24 thicker than the steel plate 100 is configured to manufacture a thickening area of the stepped steel plate. In addition, the numbers and position relations of thinning areas and thickening areas on one stepped steel plate are manufactured according to requirements, or even only a thickening area or only a thinning area is provided on one stepped steel plate. FIG. 17 and FIG. 18 provided in this embodiment are merely simple schematic diagrams and do not show all situations. Therefore, existence situations of the pattern opening 101, the step opening 1011, and the step soldering lug 2400 on the stepped steel plate shown in FIG. 17 and FIG. 18 are not used as a specific limitation to the fully-automatic cutting and welding method for stepped steel plate of this application and are only for the purpose of explanation and description.

Anything mentioning "embodiment" in the present invention means being comprised in at least one embodiment of the present invention with reference to specific components, structures, or features described in the embodiments. Exemplary statements throughout this specification do not necessarily refer to the same embodiments. In addition, when specific components, structures, or features are described with reference to any embodiment, it is claimed that implementation of such components, structures, or features with reference to other embodiments all falls within the scope of this application.

Although specific implementations of the present invention are described in detail with reference to exemplary embodiments of the present invention, it needs to be understood that those skilled in the art can design multiple other improvements and embodiments, and these improvements and embodiments fall within the spirit and scope of the principle of the present invention. Specifically, within scopes of the foregoing disclosure, accompanying drawings, and claims, suitable deformations and improvements may be made from an arrangement aspect of part and/or dependent combination layout without departing from the spirit of the present invention. In addition to the deformations and improvements in the part and/or layout aspect, scopes thereof are defined by the appended claims and equivalents thereof.

What is claimed is:

1. A fully-automatic cutting and welding apparatus for stepped steel plate comprising:
 a multi-function motion module (1), an automatic feed turntable (2), a product flip platform (3), a steel plate supporting module (4), a pedestal (5), and a base (6), wherein
 the multi-function motion module (1) is for implementing cutting and welding of a stepped steel plate and comprises a beam (11) and an X-axis moving plate (12), the multi-function motion module (1) is movably disposed on the pedestal (5), and is moveable in a Y-axis direction on the pedestal (5); the pedestal (5) is fixed on a surface edge of the base (6);
 the automatic feed turntable (2) is configured to bear a soldering lug for manufacturing a steel plate step part and is fixed at one end of the base (6);
 the product flip platform (3) is disposed between the automatic feed turntable (2) and the steel plate supporting module (4), and functions as a transit platform, and is configured to buffer a soldering lug already cut on the automatic feed turntable (2); and
 the steel plate supporting module (4) comprises a guide rail plate workpiece table (41), a steel plate adsorption module (42), and a steel plate tensioning mechanism (43), the steel plate supporting module (4) is fixed at the other end of the base (6) to bear and fix a steel plate, and is used as a welding platform for the final steel plate step part.

2. The fully-automatic cutting and welding apparatus for stepped steel plate as in claim 1, wherein in the multi-function motion module (1), an X-axis motor (141) and a sliding rail (142) are fixed on the beam (11); the motor (141) provides power to motion of the X-axis moving plate (12); the X-axis moving plate (12) is movably disposed on the beam (11) by using the sliding rail (142) and is for performing motion in an X-axis direction on the sliding rail (142); and
 the X-axis moving plate (12) is provided with a Z-axis motor (121), a Z-axis sliding block (122), and a Z-axis moving plate (13), the Z-axis moving plate (13) is movably disposed on the X-axis moving plate (12) by using the Z-axis sliding block (122), and the Z-axis motor (121) implements motion of the Z-axis moving plate (13) in a vertical direction; a positioning camera (131), a focusing lens cutting and welding apparatus (132), a height determining sensor (133), and a double-head suction cup (134) are configured in parallel on the Z-axis moving plate (13), and the positioning camera (131) implements alignment of the steel plate and the soldering lug; the focusing lens cutting and welding apparatus (132) is used for cutting and welding the steel plate and the soldering lug; the height determining sensor (133) is configured to control distances from the positioning camera (131), the focusing lens cutting and welding apparatus (132), and the double-head suction cup (134) to surfaces of a steel sheet and the soldering lug; and the double-head suction cup (134) is fixed on both sides of the Z-axis moving plate (13) and is configured to suck and grab the soldering lug.

3. The fully-automatic cutting and welding apparatus for stepped steel plate as in claim 2, wherein the pedestal (5) comprises a granite supporting base (51), a beam sliding rail (53), and a beam motor (54), and the granite supporting base (51) is fixed on the base (6); the beam sliding rail (53) is fixed to an upper end of the granite supporting base (51); the beam motor (54) is vertically fixed to the upper end of the granite supporting base (51) and is parallel to the position of the beam sliding rail (53); the pedestal (5) further comprises a beam sliding plate (52), the beam sliding plate (52) is movably disposed above the beam sliding rail (53) and the beam motor (54), the beam sliding plate (52) is configured to place the beam (11), and the beam motor (54) provides power to the beam (11), so that the beam (11) is capable of moving in a Y-axis direction on the beam sliding rail (53), so as to implement movement of the multi-function motion module (1) on the pedestal (5); the pedestal (5) further comprises a buffer (55), and the buffer is fixed on two ends of an upper surface of the pedestal (5) and is capable of buffering movement of the multi-function motion module (1) on the pedestal (5).

4. The fully-automatic cutting and welding apparatus for stepped steel plate as in claim 1, wherein the automatic feed turntable (2) comprises a fixing plate (21) and a soldering lug storage mechanism, and the fixing plate (21) is configured to support and fix the soldering lug storage mechanism; the soldering lug storage mechanism comprises a soldering lug pedestal (22), a soldering lug platform (23), a motor (25), a speed reducer (27), and a motor base (26), the soldering lug pedestal (22) has a regular cubic structure, the soldering lug platform (23) is fixed on a side surface of the soldering lug pedestal (22), the motor (25) and the speed reducer (27) cooperate to control rotation of the soldering lug pedestal (22), and the motor base (26) functions as a joint between the fixing plate (21) and the soldering lug storage mechanism.

5. The fully-automatic cutting and welding apparatus for stepped steel plate as in claim 4, wherein the soldering lug platform (23) comprises an air cylinder (231), an adsorption table (232), a platform substrate (233), a spacer block (234), a sliding module (235), and a soldering lug tensioning frame assembly; the soldering lug platform (23) is fixed on the soldering lug pedestal (22) by using the platform substrate (233); the air cylinder (231) is directly fixed at a central position on one side of the platform substrate (233); the sliding module (235) is located both on a left side and a right side of the air cylinder (231), and is fixed on the platform substrate (233); the spacer block (234) is fixed on the other side of the platform substrate (233); the soldering lug tensioning frame assembly is configured to clamp and tighten the soldering lug for manufacturing a steel plate step part, and comprises a tensioning frame pressure plate (236) and a tensioning frame fixed side (237); the tensioning frame pressure plate (236) is movably disposed above the tensioning frame fixed side (237), and helps the soldering lug be put in and taken out; two said soldering lug tensioning frame assemblies are provided on the soldering lug platform (23); one said soldering lug tensioning frame assembly is disposed above the air cylinder (231) and the sliding module (235) by using the tensioning frame fixed side (237), and the soldering lug tensioning frame assembly is moveably on the sliding module (235) under driving of the air cylinder (231); and the other soldering lug tensioning frame assembly is fixed on the spacer block (234) by using the tensioning frame fixed side (237); the adsorption table (232) is fixed to a middle part of the platform substrate (233), and the adsorption table (232) is provided with a plurality of adsorption holes used for smoothly adsorbing the soldering lug on the adsorption table (232).

6. The fully-automatic cutting and welding apparatus for stepped steel plate as in claim 1, wherein the product flip platform (3) comprises a fixing mechanism, a flip mechanism, and a camera module (35), and the fixing mechanism supports and fixes the flip mechanism;
the fixing mechanism comprises a side plate (31), a reinforcing rib (36), and a fixed bottom plate (37), the side plate (31) is fixed on two sides of the fixed bottom plate (37), and the reinforcing rib (36) is fixed between two said side plates (31);
the flip mechanism comprises a flip adsorption table (32), a fixed adsorption table (33), and a drive head (34), and the drive head (34) penetrates through a middle part above the side plate (31) by using a central shaft (324); one end of the flip adsorption table (32) is fixed on the central shaft (324) located between the two side plates (31), the flip adsorption table (32) is capable of flipping 180° under driving of the drive head (34); one reinforcing rib (36) is disposed below the other end of the flip adsorption table (32); the fixed adsorption table (33) is fixed above the two reinforcing ribs (36) and is located on the other side of the central shaft (324); when flipping 180°, the flip adsorption table (32) is located right above the fixed adsorption table (33); and the flip adsorption table (32) and the fixed adsorption table (33) are both provided with a plurality of adsorption holes; and
the camera module (35) is fixed to an outer side of the side plate (31), and when the soldering lug on the fixed adsorption table (33) is transferred to the template bearing module (4), the camera module (35) scans and positions the soldering lug.

7. The fully-automatic cutting and welding apparatus for stepped steel plate as in claim 1, wherein the guide rail plate workpiece table (41) comprises a supporting frame and an operation window, and the steel plate tensioning mechanism (43) is movably fixed in the operation window of the guide rail plate workpiece table (41); and the steel plate adsorption module (42) is disposed below the operation window of the guide rail plate workpiece table (41) and is fixed on the base (6).

8. The fully-automatic cutting and welding apparatus for stepped steel plate as in claim 7, wherein the steel plate adsorption module (42) comprises a steel plate adsorption table and a transmission mechanism, the steel plate adsorption table comprises an adsorption base plate (421), an adsorption supporting table (422), and an adsorption bottom plate (423), the adsorption base plate (421) is provided with a plurality of adsorption holes, configured to adsorb the steel plate so that the steel plate becomes smooth; the adsorption base plate (421) is fixed on the adsorption supporting table (422); and the adsorption supporting table (422) is fixed on the adsorption bottom plate (423); and
the transmission mechanism comprises a transmission guide rail (424) and a transmission sliding block (425), the transmission sliding block (425) matches with the transmission guide rail (424), and the transmission guide rail (424) is fixed on the base (6); the adsorption bottom plate (423) is fixed to the transmission sliding block (425) and is capable of moving on the transmission guide rail (424) along with the transmission sliding block (425); a transmission manner of the transmission mechanism is a belt transmission; the transmission mechanism further comprises a transmission motor (427) and a synchronous belt (426) matching with the motor (427), and one side of the synchronous belt (426) is fixed to the adsorption bottom plate (423) by using a synchronous belt pressure plate (428).

9. The fully-automatic cutting and welding apparatus for stepped steel plate as in claim 7, wherein the supporting frame comprises supporting legs (414), workpiece sliding rails (416), a supporting block (415), and a brake (413); a number of the supporting leg (414) is four, the four supporting legs (414) are distributed in a rectangle and are directly fixed on the base (6); a number of the workpiece sliding rail (416) is two, the two workpiece sliding rails (416) are separately fixed on two of the supporting legs (414) and are distributed side to side; the supporting block (415) is provided with a groove matching with the workpiece sliding rail (416), and is movably disposed at four endpoints of the workpiece sliding rail (416); and the brake (413) and the supporting block (415) are connected together and both disposed on the workpiece sliding rail (416); and
the operation window is a rectangular window formed by a workpiece frame (411) and the workpiece sliding rail (416), the workpiece frame (411) is fixed on the supporting block (415) and is capable of moving on the workpiece sliding rail (416) along with the supporting block (415); a plurality of top blocks (412) are arranged above the workpiece frame (411); a plurality of top block air cylinders (418) are arranged below the workpiece frame (411); one top block air cylinder (418) adapts to one of the top blocks (412), and the top block air cylinder (418) is capable of driving the top block (412) to perform lifting movement on the workpiece frame (411), and a slider strip (417) parallel to the top block (412) is further disposed above the workpiece frame (411).

10. The fully-automatic cutting and welding apparatus for stepped steel plate as in claim 9, wherein the steel plate tensioning mechanism (43) comprises a tensioning frame (431) and a clamping sliding side (433); the tensioning frame (431) is a rectangular frame; two endpoints of the clamping sliding side (433) are movably disposed on two frames of the tensioning frame (431); a pressing block (434) is fixed on the tensioning frame (431); the pressing block (434) is provided with a screw, the screw on the pressing block (434) is configured to connect to the clamping sliding side (433) and drive the clamping sliding side (433) to move; one of the frames of the tensioning frame (431) is a tensioning plate (432), and an upper pressing plate of tensioning plate (4321) is matched on the tensioning plate (432) for clamping the steel plate; and the remaining three frames of the tensioning frame (431) are provided with grooves matching with the slider strip (417), and the tensioning frame (431) is movably disposed on the slider strip (417), that is, the steel plate tensioning mechanism (43) is movably disposed on the guide rail plate workpiece table (41) by using the tensioning frame (431).

11. A fully-automatic cutting and welding method for stepped steel plate, comprising the following steps:
S1: cutting a steel plate opening: placing a steel plate (100) on a steel plate supporting module (4) for clamping, then cutting a pattern opening (101) for printing on the steel plate (100) of single-thickness by using a focusing lens cutting and welding apparatus (132), and at the same time, a corresponding step opening (1011) is cut in an area of the steel plate in which a step part needs to be made;
S2: cutting a soldering lug: cutting a soldering lug (24) stored in advance on an automatic feed turntable (2) by using the focusing lens cutting and welding apparatus (132), and cutting the soldering lug (24) to obtain a step soldering lug (2400) with a size corresponding to that of the step opening (1011);
S3: transferring the soldering lug: transferring the step soldering lug (2400) in step S2 from the automatic feed turntable (2) to a product flip platform (3) by using a double-head suction cup (134), and after flipping and detecting the step soldering lug (2400), then transferring the step soldering lug (2400) from the product flip platform (3) to a step opening (1011) of the steel plate on the steel plate bearing module (4); and
S4: welding the soldering lug: seamlessly soldering the step soldering lug (2400) to the step opening (1011) of the steel plate (100) of single-thickness by using the focusing lens cutting and welding apparatus (132);
wherein a device for implementing the fully-automatic cutting and welding method for stepped steel plate comprises a multi-function motion module (1), an automatic feed turntable (2), a product flip platform (3), a steel plate supporting module (4), a pedestal (5), and a base (6); the multi-function motion module (1) is provided with the focusing lens cutting and welding apparatus (132) and the double-head suction cup (134), and is capable of implementing cutting, welding, and transferring of a stepped steel plate, the multi-function motion module (1) is movably disposed on the pedestal (5), and is capable of performing motion in a Y-axis direction on the pedestal (5), so that the multi-function motion module (1) is capable of moving to the above of the automatic feed turntable (2), the product flip platform (3), and the steel plate supporting module (4) at any time;
the pedestal (5) is fixed on a surface edge of the base (6);
the automatic feed turntable (2) is configured to bear a soldering lug (24) for manufacturing a steel plate step part and is fixed at one end of the base (6);
the product flip platform (3) is disposed between the automatic feed turntable (2) and the steel plate supporting module (4), and functions as a transit platform, and is configured to buffer a step soldering lug (2400) already cut on the automatic feed turntable (2); and
the steel plate supporting module (4) is fixed at the other end of the base (6) for bearing and fixing a steel plate (100), and is used as a welding platform for the final steel plate step part.

12. The fully-automatic cutting and welding method for stepped steel plate as in claim 11, wherein the soldering lug (24) stored on the automatic feed turntable (2) has thickness of a same specification or different specifications, and a soldering lug (24) with a correspondingly adaptive specification thickness is selected according to the thickness of the steel plate (100) in step S1 to cut the needed step soldering lug (2400); wherein a soldering lug (24) thinner than the steel plate (100) is configured to manufacture a thinning area of the stepped steel plate, and a soldering lug (24) thicker than the steel plate (100) is configured to manufacture a thickening area of the stepped steel plate.

13. The fully-automatic cutting and welding method for stepped steel plate as in claim 11, wherein the multi-function motion module (1) comprises a beam (11) and an X-axis moving plate (12); an X-axis motor (141) and a sliding rail (142) are fixed on the beam (11); the motor (141) provides power to motion of the X-axis moving plate (12); the X-axis moving plate (12) is movably disposed on the beam (11) by using the sliding rail (142) and is capable of performing motion in an X-axis direction on the sliding rail (142); and
the X-axis moving plate (12) is provided with a Z-axis motor (121), a Z-axis sliding block (122), and a Z-axis moving plate (13), the Z-axis moving plate (13) is movably disposed on the X-axis moving plate (12) by using the Z-axis sliding block (122), and the Z-axis motor (121) is capable of implementing motion of the Z-axis moving plate (13) in a vertical direction; the focusing lens cutting and welding apparatus (132) and the double-head suction cup (134) are disposed on the Z-axis moving plate (13), and at the same time a positioning camera (131) and a height determining sensor (133) are further provided on the Z-axis moving plate (13); the focusing lens cutting and welding apparatus (132) is used for cutting and welding the steel plate (100) and the step soldering lug (2400); the double-head suction cup (134) is fixed on both sides of the Z-axis moving plate (13) and is configured to suck and grab the step soldering lug (2400); the positioning camera (131) is capable of implementing alignment of the steel plate (100) and the step soldering lug (2400); and the height determining sensor (133) is configured to control distances from the positioning camera (131), the focusing lens cutting and welding apparatus (132), and the double-head suction cup (134) to surfaces of a steel sheet (100) and the step soldering lug (2400).

14. The fully-automatic cutting and welding method for stepped steel plate as in claim 11, wherein the automatic feed turntable (2) comprises a fixing plate (21) and a soldering lug storage mechanism, and the fixing plate (21) is configured to support and fix the soldering lug storage mechanism; the soldering lug storage mechanism comprises a soldering lug pedestal (22), a soldering lug platform (23), a motor (25), a speed reducer (27), and a motor base (26), the soldering lug pedestal (22) has a regular cubic structure, the motor (25) and the speed reducer (27) cooperate to control rotation of the soldering lug pedestal (22), and the motor base (26) functions as a joint between the fixing plate (21) and the soldering lug storage mechanism; and the soldering lug platform (23) comprises an air cylinder (231), an adsorption table (232), a platform substrate (233), a spacer block (234), a sliding module (235), and a soldering lug tensioning frame assembly; the soldering lug platform (23) is fixed to side surfaces of the soldering lug pedestal (22) by using the platform substrate (233); the air cylinder (231) is directly fixed at a central position on one side of the platform substrate (233); the sliding module (235) is located on both a left side and a right side of the air cylinder (231) and is fixed on the platform substrate (233); the spacer block (234) is fixed on the other side of the platform substrate (233); the soldering lug tensioning frame assembly is configured to clamp the step soldering lug (2400); two said soldering lug tensioning frame assemblies are provided on the soldering lug platform (23); one said soldering lug tensioning frame assembly is disposed above the air cylinder (231) and the sliding module (235), and the soldering lug tensioning frame assembly is capable of sliding on the sliding module (235) under driving of the air cylinder (231); and the other soldering lug tensioning frame assembly is fixed on the spacer block (234); the adsorption table (232) is fixed to a middle part of the platform substrate (233), and the adsorption table (232) is provided with a plurality of adsorption holes, which are capable of smoothly fixing the soldering lug (24) on the adsorption table (232).

15. The fully-automatic cutting and welding method for stepped steel plate as in claim 11, wherein the product flip platform (3) comprises a fixing mechanism, a flip mechanism, and a camera module (35), the fixing mechanism supports and fixes the flip mechanism;

the fixing mechanism comprises a side plate (31), a reinforcing rib (36), and a fixed bottom plate (37), the side plate (31) is fixed on two sides of the fixed bottom plate (37), and the reinforcing rib (36) is fixed between two said side plates (31); and the flip mechanism comprises a flip adsorption table (32), a fixed adsorption table (33), and a drive head (34), and the drive head (34) penetrates through a middle part above the side plate (31) by using a central shaft (324); one end of the flip adsorption table (32) is fixed on the central shaft (324) located between the two side plates (31), so that the flip adsorption table (32) is capable of flipping 180° under driving of the drive head (34); one reinforcing rib (36) is disposed below the other end of the flip adsorption table (32); the fixed adsorption table (33) is fixed above two reinforcing ribs (36) and is located on the other side of the central shaft (324); when flipping 180°, the flip adsorption table (32) is located right above the fixed adsorption table (33); the flip adsorption table (32) and the fixed adsorption table (33) are both provided with a plurality of adsorption holes; and the camera module (35) is fixed to an outer side of the side plate (31).

16. The fully-automatic cutting and welding method for stepped steel plate as in claim 15, wherein the step soldering lug (2400) in step S3 is transferred onto the flip adsorption table (32) of the product flip platform (3) by using the double-head suction cup (134), the flip adsorption table (32) flips 180° and releases an adsorption force for the step soldering lug (2400), and the fixed adsorption table (33) increases an adsorption force so that the step soldering lug (2400) smoothly falls on the fixed adsorption table (33) after flipping, to implement a flipping process of the step soldering lug (2400) in step S3; before being transferred by the double-head suction cup (134) to a template supporting module (4), the step soldering lug (2400) on the fixed adsorption table (33) passes through the above of the camera module (35), so that the camera module (35) scans and positions the step soldering lug (2400), to ensure accuracy of the position when the step soldering lug (2400) is transferred to the step opening (1011) of the steel plate on the steel plate bearing module (4).

17. The fully-automatic cutting and welding method for stepped steel plate as in claim 11, wherein the steel plate supporting module (4) comprises a guide rail plate workpiece table (41), a steel plate adsorption module (42), and a steel plate tensioning mechanism (43); the guide rail plate workpiece table (41) is configured to support the steel plate tensioning mechanism (43), and the guide rail plate workpiece table (41) comprises a supporting frame and an operation window, and the steel plate tensioning mechanism (43) is movably fixed in the operation window of the guide rail plate workpiece table (41); the steel plate tensioning mechanism (43) is configured to clamp and release the steel plate (100); and the steel plate adsorption module (42) is disposed below the operation window of the guide rail plate workpiece table (41) in a belt transmission manner and is fixed on the base (6).

18. The fully-automatic cutting and welding method for stepped steel plate as in claim 11, wherein the pedestal (5) comprises a granite supporting base (51), a beam sliding rail (53), and a beam motor (54), and the granite supporting base (51) is fixed on the base (6); the pedestal (5) further comprises a beam sliding plate (52), the beam sliding plate (52) is movably disposed above the beam sliding rail (53) and the beam motor (54), the beam sliding plate (52) is configured to place the beam (11), and the beam motor (54) provides power to the beam (11), so that the beam (11) is capable of moving in a Y-axis direction on the beam sliding rail (53), so as to implement movement of the multi-function motion module (1) towards the above of the automatic feed turntable (2), the product flip platform (3), and the steel plate supporting module (4) on the pedestal (5).

* * * * *